United States Patent
Kwak et al.

(10) Patent No.: US 12,451,481 B2
(45) Date of Patent: Oct. 21, 2025

(54) METHOD OF PRODUCING POSITIVE ELECTRODE ACTIVE MATERIAL FOR LITHIUM SECONDARY BATTERY AND POSITIVE ELECTRODE ACTIVE MATERIAL FOR LITHIUM SECONDARY BATTERY PRODUCED THEREBY

(71) Applicant: LG Chem, Ltd., Seoul (KR)

(72) Inventors: No Woo Kwak, Daejeon (KR); Hyuck Lee, Daejeon (KR); Duck Gyun Mok, Daejeon (KR); Min Hee Son, Daejeon (KR)

(73) Assignee: LG Chem, Ltd., Seoul (KR)

( * ) Notice: Subject to any disclaimer, the term of this patent is extended or adjusted under 35 U.S.C. 154(b) by 868 days.

(21) Appl. No.: 17/606,268

(22) PCT Filed: Nov. 27, 2020

(86) PCT No.: PCT/KR2020/017079
§ 371 (c)(1),
(2) Date: Oct. 25, 2021

(87) PCT Pub. No.: WO2021/107684
PCT Pub. Date: Jun. 3, 2021

(65) Prior Publication Data
US 2022/0216463 A1    Jul. 7, 2022

(30) Foreign Application Priority Data
Nov. 28, 2019 (KR) .................. 10-2019-0155170

(51) Int. Cl.
*H01M 4/36* (2006.01)
*C01G 53/50* (2025.01)
(Continued)

(52) U.S. Cl.
CPC ............ *H01M 4/366* (2013.01); *C01G 53/50* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

2008/0024056 A1    1/2008   Sung et al.
2009/0004567 A1*   1/2009   Yonezawa .......... H01M 10/0569
                                                                429/221
(Continued)

FOREIGN PATENT DOCUMENTS

CN    105406056 A    3/2016
CN    108352527 A    7/2018
(Continued)

OTHER PUBLICATIONS

Machine Translation of JP 2017050204A (Year: 2017).*
(Continued)

*Primary Examiner* — Gregg Cantelmo
(74) *Attorney, Agent, or Firm* — Lerner David LLP (57) ABSTRACT

A positive electrode active material contains a lithium transition metal oxide in the form of a secondary particle in which primary particles are aggregated, wherein a zirconium-containing coating film is formed on the surface of the lithium transition metal oxide secondary particle and at the interface between the primary particles present inside the secondary particle. A method of making the positive electrode active material is also provided.

6 Claims, 4 Drawing Sheets

(51) Int. Cl.
  *H01M 4/02* (2006.01)
  *H01M 4/505* (2010.01)
  *H01M 4/525* (2010.01)
  *H01M 4/62* (2006.01)
  *H01M 10/0525* (2010.01)

(52) U.S. Cl.
  CPC ......... *H01M 4/62* (2013.01); *H01M 10/0525* (2013.01); *C01P 2002/52* (2013.01); *C01P 2004/03* (2013.01); *C01P 2004/82* (2013.01); *C01P 2006/40* (2013.01); *H01M 2004/028* (2013.01)

(56) References Cited

U.S. PATENT DOCUMENTS

| | | | |
|---|---|---|---|
| 2012/0231322 A1* | 9/2012 | Chu | H01M 4/485 429/207 |
| 2013/0236788 A1* | 9/2013 | Tsunozaki | C01G 51/50 427/126.3 |
| 2015/0340689 A1* | 11/2015 | Song | H01M 4/5825 427/126.3 |
| 2015/0357638 A1 | 12/2015 | Sun et al. | |
| 2016/0013476 A1 | 1/2016 | Oh et al. | |
| 2017/0155141 A1 | 6/2017 | Kokubu et al. | |
| 2017/0324084 A1 | 11/2017 | Lee et al. | |
| 2018/0026268 A1 | 1/2018 | Kim et al. | |
| 2018/0048015 A1* | 2/2018 | Lee | H01M 10/058 |
| 2018/0108940 A1* | 4/2018 | Kwon | C01G 53/50 |
| 2018/0123118 A1 | 5/2018 | Furuichi et al. | |
| 2018/0212237 A1 | 7/2018 | Lee et al. | |
| 2018/0287135 A1 | 10/2018 | Shin et al. | |
| 2018/0351169 A1 | 12/2018 | Oh et al. | |
| 2019/0020023 A1 | 1/2019 | Yokoyama et al. | |
| 2019/0067689 A1 | 2/2019 | Hong et al. | |
| 2019/0115596 A1 | 4/2019 | Kajiyama et al. | |
| 2019/0221844 A1 | 7/2019 | Kim et al. | |
| 2020/0067072 A1 | 2/2020 | Choi et al. | |
| 2020/0161650 A1 | 5/2020 | Park et al. | |
| 2020/0403218 A1 | 12/2020 | Furuichi et al. | |
| 2021/0135187 A1 | 5/2021 | Park et al. | |
| 2021/0265628 A1 | 8/2021 | Kim et al. | |
| 2021/0288309 A1 | 9/2021 | Choi et al. | |

FOREIGN PATENT DOCUMENTS

| | | | | |
|---|---|---|---|---|
| CN | 108598382 | A | | 9/2018 |
| CN | 108777295 | A * | 11/2018 | |
| CN | 108886144 | A | | 11/2018 |
| CN | 109428074 | A | | 3/2019 |
| EP | 3272710 | A1 * | 1/2018 | ........... C01G 53/006 |
| JP | 2012074390 | A | | 4/2012 |
| JP | 2013206679 | A | | 10/2013 |
| JP | 5464717 | B2 | | 4/2014 |
| JP | 2014063732 | A | | 4/2014 |
| JP | 2015536558 | A | | 12/2015 |
| JP | 2017050204 | A * | 3/2017 | |
| JP | 2018014326 | A | | 1/2018 |
| JP | 2020031052 | A | | 2/2020 |
| KR | 20080010122 | A | | 1/2008 |
| KR | 20100070181 | A | | 6/2010 |
| KR | 2017-0063395 | A | | 6/2017 |
| KR | 20170076088 | A | | 7/2017 |
| KR | 2017-0103699 | A | | 9/2017 |
| KR | 2018-0010122 | A | | 1/2018 |
| KR | 20190059115 | A | | 5/2019 |
| KR | 20190059249 | A | | 5/2019 |
| KR | 20190079526 | A | | 7/2019 |
| KR | 20190131842 | A | | 11/2019 |
| WO | WO-2019103488 | A1 * | 5/2019 | ............. C01G 53/00 |

OTHER PUBLICATIONS

Machine Translation of WO 2019103488 (Year: 2019).*
Machine Translation of CN-108777295-A (Year: 2018).*
International Search Report for Application No. PCT/KR2020/017079 mailed Mar. 11, 2021, 2 Pages.
Extended European Search Report for Application No. 20894830.7 dated Jul. 1, 2022. 8 pgs.
Search Report dated Dec. 7, 2023 from the Office Action for Chinese Application 202080032118.6 issued Dec. 12, 2023, 3 pages.

* cited by examiner

METHOD OF PRODUCING POSITIVE ELECTRODE ACTIVE MATERIAL FOR LITHIUM SECONDARY BATTERY AND POSITIVE ELECTRODE ACTIVE MATERIAL FOR LITHIUM SECONDARY BATTERY PRODUCED THEREBY

CROSS-REFERENCE TO RELATED APPLICATIONS

This application is a national phase entry under 35 U.S.C. § 371 of International Application No. PCT/KR2020/017079, filed on Nov. 27, 2020, which claims the benefit of Korean Patent Application No. 10-2019-0155170, filed on Nov. 28, 2019, in the Korean Intellectual Property Office, the disclosures of which are incorporated herein in its entirety by reference.

TECHNICAL FIELD

The present invention relates to a method of producing a positive electrode active material for a lithium secondary battery and a positive electrode active material produced thereby, and a positive electrode for a lithium secondary battery including the positive electrode active material, and a lithium secondary battery.

BACKGROUND ART

As technology development and demand for mobile devices have increased, the demand for secondary batteries as an energy source has been rapidly increased. Among such secondary batteries, lithium secondary batteries having high energy density and voltage, long cycle life, and low self-discharging rate have been commercialized and widely used.

As a positive electrode active material of a lithium secondary battery, a lithium transition metal oxide is used. Among such lithium transition metal oxides, a lithium-cobalt oxide, such as $LiCoO_2$, which has a high functional voltage and excellent capacity properties has been typically used. However, $LiCoO_2$ is very poor in thermal properties due to the destabilization of a crystal structure according to de-lithium, and is also expensive. Accordingly, $LiCoO_2$ has a limitation in being used as a power source in a field such as an electric vehicle or the like in a large amount.

As a material to replace $LiCoO_2$, a lithium manganese composite metal oxide ($LiMnO_2$, $LiMn_2O_4$, and the like), a lithium iron phosphate compound ($LiFePO_4$ and the like), or a lithium nickel composite metal oxide ($LiNiO_2$ and the like) and the like has been developed. Among the above materials, research and development has been actively conducted on a lithium nickel composite metal oxide which has a high reversible capacity of about 200 mAh/g, thereby easily implementing a high capacity battery. However, when compared with $LiCoO_2$, $LiNiO_2$ has a lower thermal stability, and has a problem in that when an internal short circuit occurs due to external pressure or the like in a charged state, a positive electrode active material itself is decomposed, causing the rupture and ignition of a battery. Accordingly, as a method for improving the thermal stability of $LiNiO_2$, which is low, while keeping the excellent reversible capacity thereof, $LiNi_{1-\alpha}Co_\alpha O_2$ ($\alpha$=0.1~0.3), in which a part of nickel is substituted with cobalt, or a lithium-nickel-cobalt metal oxide, in which a part of nickel is substituted with Mn, Co, or Al, has been developed.

However, such a positive electrode active material involves a volume change in unit lattice due to intercalation and/or deintercalation of lithium ions as charging/discharging is repeated, and the volume change causes cracks along the interface between primary particles present inside the positive electrode active material, and accordingly, the cracks serve as a void that reduces the conductivity of the positive electrode active material, or increase the generation of fine powder to cause deterioration in capacity properties and resistance properties during charging/discharging.

In order to overcome these issues, conventionally, methods of improving the physical properties of the positive electrode active material by doping the inside of lattice of a lithium transition metal oxide with non-transition metal elements or coating the surface of a positive electrode active material particle with non-transition metal elements have been proposed. However, there is a problem in that the conventional doping or coating is not capable enough to prevent the generation of cracks and/or fine powder. In addition, in the case of doping, there is a problem in that the capacity properties are deteriorated because the non-transition metal elements are substituted at transition metal sites of the crystal lattice of the lithium transition metal oxide.

For that reason, there is a demand for development of a positive electrode active material capable of preventing the occurrence of cracks and fine powder while minimizing capacity reduction.

DISCLOSURE OF THE INVENTION

Technical Problem

In order to solve the above problem, the present invention provides a method of producing a positive electrode active material capable of coating both the surface of a secondary particle of the positive electrode active material and the interface between primary particles present inside the secondary particle, and a positive electrode active material produced thereby.

The present invention also provides a positive electrode for a lithium secondary battery including the positive electrode active material, and a lithium secondary battery including the same.

Technical Solution

In an aspect, the present invention provides a method of producing a positive electrode active material, the method including a first step of mixing lithium transition metal oxides in the form of a secondary particle in which primary particles are aggregated, a zirconium-containing raw material, and at least one sintering aid selected from the group consisting of $Bi_2O_3$, $Sb_2O_3$, $Li_2O$, $LiOH \cdot H_2O$, $Co_2O_3$, and NiO to form a mixture; and a second step of heat treating the mixture to form a zirconium-containing coating film on the surface of the lithium transition metal oxide secondary particle and at the interface between the primary particles present inside the secondary particle.

In another aspect, the present invention provides a positive electrode active material containing a lithium transition metal oxide in the form of a secondary particle in which primary particles are aggregated, wherein the zirconium-containing coating film is formed on the surface of the lithium transition metal oxide secondary particle and at the interface between the primary particles present inside the secondary particle.

In another aspect, the present invention provides a positive electrode for a lithium secondary battery including the positive electrode active material, and a lithium secondary battery including the same.

Advantageous Effects

In a method of producing a positive electrode active material according to the present invention, a zirconium raw material and a sintering aid are mixed together with a lithium transition metal oxide in the form of a secondary particle, and heat treated to form a coating layer. When the zirconium raw material and the sintering aid are heat treated together as in the present invention, a liquid phase is formed between the lithium transition metal oxide and the zirconium raw material by the sintering aid, and thus, the zirconium raw material moves to the outer interface, which is an interface between primary particles on the surface of the lithium transition metal oxide, and during the heat treatment process, zirconium is diffused from the outer interface to the inner interface, which is an interface between the primary particles inside the lithium transition metal oxide particle. Thus, according to the production method of the present invention, a zirconium-containing coating film may be formed both on the surface of the lithium transition metal oxide secondary particle and at the interface (inner interface) between the primary particles present inside the secondary particle.

When the zirconium-containing coating film is formed both on the surface of the secondary particle of the positive electrode active material and the inner interface between the primary particles present inside the secondary particle as in the present invention, it may effectively prevent cracks and/or fine powder of the positive electrode active material from being caused during charging/discharging. In addition, in the positive electrode active material of the present invention, zirconium is not present in the crystal lattice of the lithium transition metal oxide, but is applied onto the surface of the primary particles, and capacity reduction due to the introduction of zirconium may thus be minimized. Therefore, when the positive electrode active material of the present invention is applied to a secondary battery, excellent capacity properties and lifespan characteristics may be achieved.

MODE FOR CARRYING OUT THE INVENTION

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, with respect to the principle that an inventor may properly define the meaning of the words or terms to best explain the invention.

In the present invention, a 'primary particle' refers to a smallest particle unit that is distinguished as being one mass when a cross-section of a positive electrode active material is observed through a scanning electron microscope (SEM), and may be made of a single crystal grain, or a plurality of crystal grains. In the present invention, an average particle diameter of the primary particle may be measured by a method for measuring the size of each particle distinguished in a cross-sectional SEM image of the positive electrode active material particle.

In the present invention, a 'secondary particle' refers to a secondary structural body formed by aggregation of a plurality of primary particles. An average particle diameter of the secondary particle may be measured using a particle size analyzer, and in the present invention, s3500 from Microtrac Co., Ltd. was used as a particle size analyzer.

The term "particle diameter Dn" in the present invention refers to a particle diameter at n % of cumulative distribution of volume according to the particle diameter. That is, D50 is a particle diameter at 50% of the cumulative distribution of volume according to the particle diameter, D90 is a particle diameter at 90% of the cumulative distribution of volume according to the particle diameter, and D10 is a particle diameter at 10% of the cumulative distribution of volume according to the particle diameter. The Dn may be measured by using a laser diffraction method. Specifically, after dispersing measurement target powder in a dispersion medium, the dispersion medium is introduced into a commercial laser diffraction particle size measurement instrument (e.g., Microtrac S3500) and a particle size distribution is calculated by measuring a difference in diffraction patterns due to a particle size when particles pass through a laser beam. The D10, D50, and D90 may be measured by calculating particle diameters at 10%, 50%, and 90% of the cumulative distribution of volume according to the particle diameter using the measurement instrument.

In the present invention, an 'outer interface' refers to an interface between primary particles and primary particles exposed on the surface of a secondary particle, and an 'inner interface' refers to an interface between primary particles and primary particles present inside the secondary particle.

Method of Producing Positive Electrode Active Material

As a result of the present inventors' continuous research efforts to improve the stability of a positive electrode active material, the inventors found out that forming a zirconium coating film on the surface of the positive electrode active material particle and at the interface between primary particles present inside the particle would improve the lifespan characteristics and resistance properties of the positive electrode active material, thereby achieving the present invention.

A method of producing a positive electrode active material according to the present invention includes (1) mixing a lithium transition metal oxide, a zirconium-containing raw material, and a sintering aid to form a mixture (first step), and (2) heat-treating the mixture to form a zirconium-containing coating film on the surface of the lithium transition metal oxide secondary particle and at the interface between primary particles present inside the secondary particle (second step).

Hereinafter, the method of producing a positive electrode active material according to the present invention will be described in more detail.

First, a lithium transition metal oxide, a zirconium-containing raw material, and a sintering aid are mixed to form a mixture (first step).

The lithium transition metal oxide according to the present invention is a lithium transition metal oxide in the form of a secondary particle in which primary particles are aggregated, and may be used without limitation as long as intercalation and deintercalation of lithium ions are easily allowed during charging/discharging.

For example, the lithium transition metal oxide may be a layered compound such as lithium cobalt oxide ($LiCoO_2$) or lithium nickel oxide ($LiNiO_2$), or a compound substituted with one or more transition metals; lithium manganese oxide such as Formula $Li_{1+y1}Mn_{2-y1}O_4$ (0≤y1≤0.33), $LiMnO_3$, $LiMn_2O_3$, and $LiMnO_2$; lithium copper oxide ($Li_2CuO_2$); vanadium oxide such as $LiV_3O_8$, $LiFe_3O_4$, $V_2O_5$, and $Cu_2V_2O_7$; Ni site type lithium nickel oxide represented by Formula $LiNi_{1-y2}M_{y2}O_2$ (where M is at least one selected from the group consisting of Co, Mn, Al, Cu, Fe, Mg, B, and Ga, and 0.01≤y2≤0.3); lithium manganese composite oxide represented by Formula $LiMn_{2-y3}M_{y3}O_2$ (where M is at least one selected from the group consisting of Co, Ni, Fe, Cr, Zn, and Ta, and 0.01≤y3≤0.1) or $Li_2Mn_3MO_8$ (where M is at least one selected from the group consisting of Fe, Co, Ni, Cu, and Zn); $LiMn_2O_4$ in which part of Li in Formula is substituted with alkaline earth metal ions, etc.

Preferably, the lithium transition metal oxide according to the present invention may be represented by Formula 1 below.

[Formula 1]

$Li_aNi_xCo_yM^1_zM^2_wO_2$

In Formula 1 above, $M^1$ is Mn, Al, or a combination thereof, and $M^2$ is at least one selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo.

a above is a molar ratio of Li in the lithium transition metal oxide, and may be 0.8≤a≤1.2, 0.85≤a≤1.15, or 0.9≤a≤1.1.

x above is a molar ratio of Ni among other metals excluding lithium in the lithium transition metal oxide, and may be 0<x<1, 0.5≤x<1, 0.6≤x<1, 0.7≤x<1, 0.8≤x<1, or 0.85≤x<1.

y above is a molar ratio of Co among other metals excluding lithium in the lithium transition metal oxide, and may be 0<y<1, 0<y<0.50, 0<y<0.40, 0<y<0.30, 0<y<0.20, or 0<y<0.15.

Z above is a molar ratio of $M^1$ among other metals excluding lithium in the lithium transition metal oxide, and may be 0<z<1, 0<z<0.50, 0<z<0.40, 0<z<0.30, 0<z<0.20, or 0<z<0.15.

w above is a molar ratio of $M^2$ among other metals excluding lithium in the lithium transition metal oxide, and may be 0≤w≤0.1, 0≤w≤0.05, or 0≤w≤0.02.

The lithium transition metal oxide may be used through the purchase of a commercially available positive electrode active material, or may be produced according to a method of producing a positive electrode active material, which is well known in the art.

For example, the lithium transition metal oxide according to the present invention may be produced by performing a co-precipitation reaction of raw materials of transition metals to form a transition metal hydroxide, and then mixing the transition metal hydroxide with a lithium raw material and firing the mixture.

In this case, as the lithium raw material, lithium carbonate ($Li_2Co_3$) or lithium hydroxide ($LiOH·H_2O$) may be used, and the firing may be performed at 500° C. to 1,000° C., preferably 700° C. to 1000° C. When the firing temperature is less than 500° C., the reaction between the lithium raw material and the transition metal hydroxide may not be sufficient, and when the firing temperature is greater than 1,000° C., a positive electrode active material may be produced in the form of a single particle rather than in the form of a secondary particle due to over firing.

Meanwhile, the zirconium-containing raw material may be used without particular limitation as long as the material contains a zirconium (Zr) element. For example, the zirconium-containing raw material may be at least one selected from the group consisting of $ZrO_2$, $Zr(OH)_4$, $Zr_{1-x}A_xO_2$ (where A is at least one element selected from the group consisting of Y, Ce, and Sc, and 0≤x≤0.99), and $ZrH_2$.

The zirconium-containing raw material may be mixed such that the amount of zirconium is 50 ppm to 50,000 ppm, preferably 500 ppm to 10,000 ppm, more preferably 1,000 ppm to 6,000 ppm, with respect to the total weight of the positive electrode active material. For example, when the amount of zirconium contained in the positive electrode active material according to the addition of the zirconium-containing raw material exceeds the above range, a decrease in energy density is caused to reduce the capacity of the secondary battery containing the raw material or increase resistance, and when zirconium is contained in an amount of less than the above range, improvements in particle strength, prevention of cracking and/or fine powder resulting from the zirconium coating may be insignificant.

Meanwhile, the sintering aid is added to allow zirconium to be applied onto the inner interface of the lithium transition metal oxide, and may be at least one selected from the group consisting of $Bi_2O_3$, $Sb_2O_3$, $Li_2O$, $LiOH·H_2O$, $Co_2O_3$, and NiO.

The sintering aid may be mixed in an amount of 0.01 mol to 1 mol, preferably 0.05 mol to 0.5 mol per 1 mol of the zirconium-containing raw material. When the amount of the sintering aid exceeds the above range, a decrease in energy density is caused to reduce the capacity of the secondary battery having the sintering aid or increase resistance, and when the sintering aid is contained in an amount of less than the above range, the coating at the outer interface and the inner interface may be deteriorated.

Next, the mixture of the lithium transition metal oxide, the zirconium-containing raw material, and the sintering aid is heat treated to form a zirconium-containing coating film on the surface of the secondary particle of the lithium transition metal oxide and at the interface between the primary particles present inside the secondary particle (second step).

The heat treatment may be performed at, for example, 300° C. to 1,000° C., preferably 500° C. to 800° C. When the heat treatment temperature satisfies the above range, the zirconium-containing raw material present at the outer interface of the secondary particle diffuses into the particle through the outer interface, and zirconium may thus be evenly applied onto the outer interface of the secondary particle surface of the lithium transition metal oxide and onto the inner interface inside the secondary particle. When the heat treatment is performed at less than 300° C., the coating of zirconium elements may not be easy, and thus, when washing after producing a positive electrode active material, all zirconium may be washed away, and when the heat treatment is performed at greater than 1,000° C., zirconium may be doped into the crystal lattice of the lithium transition metal oxide, and the crystal structure of the lithium transition metal oxide may be deformed to deteriorate capacity properties.

Figure 1:
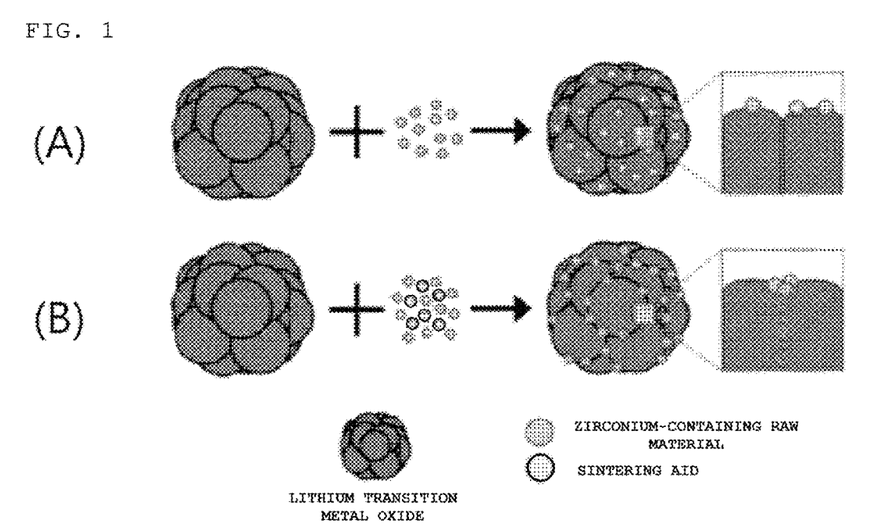
FIG. 1(A) an illustration depicting a conventional coating process and FIG. 1(B) illustrates a coating process according to one aspect of the present invention.
Figure 2:
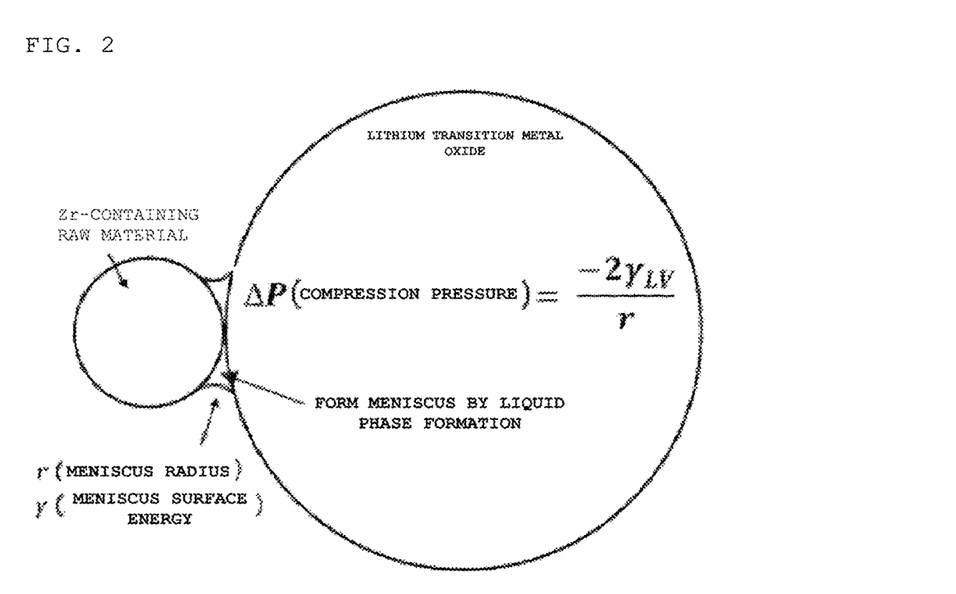
FIG. 2 is an illustration depicting a liquid phase forming process occurring during heat treatment according to the present invention.

FIG. 1 is a view describing differences between a coating process of the present invention using a sintering aid and a conventional coating process without using a sintering aid, and FIG. 2 is a view describing a liquid phase forming process that occurs when heat treatment is performed according to a method of the present invention.

Referring to FIGS. 1 and 2, according to a conventional coating process in which a zirconium-containing raw material and a lithium transition metal oxide are mixed and then heat treated without a sintering aid, as shown in FIG. 1(A), the zirconium-containing raw material is randomly attached on the surface of the lithium transition metal oxide. In contrast, when a zirconium-containing raw material and a lithium transition metal oxide are mixed and heat treated with a sintering aid as in the present invention, as shown in FIG. 2, the sintering aid and the zirconium-containing raw material react to form a reactive liquid phase between the lithium transition metal oxide and the zirconium-containing raw material, and the liquid phase moves to a contact point between the positive electrode active material particle and the zirconium-containing raw material, thereby forming a meniscus to generate a compression pressure. By the compression pressure, as shown in FIG. 1(B), the zirconium-containing raw material moves from the surface of the lithium transition metal oxide to the interface (outer interface) between primary particles, which is a region having low thermodynamic energy, some of the zirconium-containing raw material gathered at the outer interface during the heat treatment process remains on the surface of the secondary particle to form a zirconium-containing coating film at the outer interface, and other some of the zirconium-containing raw material diffuses into the secondary particle along the interface between the primary particles to form a zirconium-containing coating film at the inner interface of the secondary particle.

Here, the 'meniscus' is the curve portion of a liquid surface inside the capillary tube, which is caused by capillary action and formed upward (convex) or downward (concave) along the tube wall, and in the present invention, the 'meniscus' indicates a curved surface of a liquid phase produced through the reaction of the lithium transition metal oxide and the sintering aid, which is formed between the lithium transition metal oxide and the zirconium-containing raw material.

Meanwhile, the compression pressure may be calculated by Equation 1 below, and may be appropriately applied according to temperature, pressure, size of the positive electrode active material, and the like in the production of the positive electrode active material. When the compression pressure increases, the zirconium-containing raw material may easily move from the outer surface of the positive electrode active material particle to the outer interface having low thermodynamic energy.

Compression pressure $(\Delta P) = -2\gamma_{LV}/r$     [Equation 1]

In Equation 1 above, $\gamma_{LV}$ is the surface energy between the meniscus and the surrounding gas, and r is the meniscus radius.

Here, the meniscus surface energy may be measured using a method of measuring angles formed between the stationary liquid droplet and the surface after dropping a liquid droplet onto a solid surface using a static contact angle measurement method, and the meniscus radius may be directly measured using a shape analysis method.

When the zirconium coating film is formed at the outer and inner interfaces as described above, the occurrence of cracks at the interface between the primary particles is prevented, thereby increasing the strength of the lithium transition metal oxide particle, and the generation of fine powder caused by the cracking of positive electrode active material particle during rolling or charging/discharging may be effectively prevented.

Meanwhile, the method of producing a positive electrode active material of the present invention may further perform washing and/or forming a coating layer, if necessary.

For example, the method of producing a positive electrode active material according to the present invention may further include washing the lithium transition metal oxide in which the zirconium-containing coating film is formed on the surface of the secondary particle and at the interface between the primary particles present inside the secondary particle.

The washing is to remove residual lithium present on the surface of the lithium transition metal oxide, and may be performed by mixing and stirring the lithium transition metal oxide in which the coating film is formed and a washing solution.

For example, the washing may be performed by mixing the lithium transition metal oxide and the washing solution in a weight ratio of 1:0.5 to 1:2, preferably in a weight ratio of 1:0.7 to 1:1.2, and stirring the mixture for 2 to 20 minutes. When the mixing ratio of the lithium transition metal oxide to the washing solution satisfies the above range, residual lithium may be effectively removed without damaging the lithium transition metal oxide. When the mixing amount of the washing solution to the lithium transition metal oxide is too small, the removal of residual lithium may not be sufficient to generate gas, and when the mixing amount of the washing solution is too large, surface defects of the lithium transition metal oxide are caused, resulting in a decrease in lifespan characteristics and an increase in resistance.

The washing solution may be at least one of water or ethanol, but is not limited thereto. Preferably, water may be used as the washing solution, and in this case, when lithium by-products are sufficiently dissolved at room temperature, the lithium by-products present on the surface of the lithium transition metal oxide may be more easily removed.

In addition, the method of producing a positive electrode active material of the present invention may further perform forming a coating layer after the second step or after the washing step.

The forming of the coating layer may refer to forming a coating layer containing at least one coating element selected from the group consisting of B, Li, Al, F, W, Mo, Ti, and Nb on the surface of the lithium transition metal oxide in which the zirconium-containing coating film is formed on the surface of the secondary particle and at the interface between the primary particles present inside the secondary particle.

As described above, when the coating layer containing at least one coating element selected from the group consisting of B, Li, Al, F, W, Mo, Ti, and Nb is further formed on the surface of the lithium transition metal oxide, the contact between an electrolyte and the lithium transition metal oxide is blocked through the coating layer, thereby preventing transition metal elution or gas generation.

Specifically, the forming of the coating layer may be performed by mixing a lithium transition metal oxide in which the zirconium-containing coating film is formed and a raw material containing a coating element (M), and heat treating the mixture.

In this case, the coating element (M) may be at least one selected from the group consisting of B, Li, Al, F, W, Mo, Ti, and Nb, and the raw material containing the coating element (M) may be acetate, sulfate, carbonate, nitrate, hydroxide, oxide, or halide of the coating element (M). For example, the raw material containing the coating element (M) may be boric acid, aluminum oxide, tungsten oxide, or the like, but is not limited thereto.

Meanwhile, the raw material containing the coating element (M) is preferably mixed in an amount such that the amount of the coating element (M) is 50 ppm to 5,000 ppm, preferably 50 ppm to 2,000 ppm, with respect to the total weight of the positive electrode active material. When the amount of the coating element is too large, the coating layer is formed excessively thick, which may adversely affect capacity properties and resistance properties, and when the amount of the coating element is too small, an electrolyte is not effectively blocked.

Meanwhile, the heat treatment for forming the coating layer may be performed at 200° C. to 700° C., preferably 250° C. to 500° C., and more preferably 300° C. to 500° C. When the heat treatment temperature satisfies the above range, the coating layer may be well formed without deterioration of the physical properties of the lithium transition metal oxide. When the heat treatment temperature is too high, the crystal structure of the lithium transition metal oxide may be deformed, resulting in deterioration of the physical properties of the positive electrode active material, and when the heat treatment temperature is too low, the coating layer may not be formed properly.

Positive Electrode Active Material

Next, a positive electrode active material according to the present invention will be described.

The positive electrode active material according to the present invention is a positive electrode active material produced according to the production method of the present invention described above, and is a positive electrode active material containing a lithium transition metal oxide in which a zirconium-containing coating film is formed at the outer and inner interfaces.

Specifically, the positive electrode active material of the present invention contains a lithium transition metal oxide in the form of a secondary particle in which primary particles are aggregated, and in this case, a zirconium-containing coating film is formed on the surface of the lithium transition metal oxide secondary particle and at the interface between the primary particles present inside the lithium transition metal oxide secondary particle.

The lithium transition metal oxide is a lithium transition metal oxide in the form of a secondary particle in which primary particles are aggregated, and is not limited thereto, but may be, for example, a lithium transition metal oxide represented by Formula 1 below.

[Formula 1]

In Formula 1 above, the definitions of $M^1$, $M^2$, a, x, y, z, and w are the same as described above.

The lithium transition metal oxide is in the form of a secondary particle formed by aggregation of a plurality of primary particles, and in this case, the primary particles may have an average particle diameter of 100 nm to 5 μm, preferably 300 nm to 3 μm, more preferably 500 nm to 3 μm, and the secondary particle may have an average particle diameter D50 of 3 μm to 20 μm, preferably 4 μm to 15 μm.

When the primary particle average particle diameter satisfies the above range, a zirconium-containing coating film is well formed at the interface between the primary particles, and when the secondary particle average particle diameter satisfies the above range, a positive electrode active material having excellent capacity properties and resistance properties may be obtained. When the secondary particle average particle diameter is too large, capacity reduction and resistance increase may be caused, and when the secondary particle average particle diameter is too small, gelation may be caused during preparation of a positive electrode slurry.

Meanwhile, the positive electrode active material according to the present invention may contain zirconium in an amount of 50 ppm to 50,000 ppm, preferably 500 ppm to 10,000 ppm, more preferably 1,000 ppm to 6,000 ppm, with respect to the total weight of the positive electrode active material. When the amount of zirconium in the positive electrode active material satisfies the above range, a coating film is properly formed on the surface of the lithium transition metal oxide secondary particle and at the inner interface, thereby minimizing deterioration of the physical properties of the positive electrode active material, and effectively preventing cracks and/or fine power from being caused during rolling or charging/discharging.

In addition, in the positive electrode active material according to the present invention, it is preferable that the amount of zirconium contained inside the lithium transition metal oxide secondary particle is about 1 atm % to about 50 atm %, preferably about 5 atm % to about 30 atm %, with respect to the total amount of zirconium applied on lithium transition metal oxide. When the amount of zirconium applied inside the secondary particle satisfies the above range, prevention of cracks and/or fine powder effectively works.

In this case, the inside of the lithium transition metal oxide secondary particle indicates a region at a distance of (R−1) μm from the center of the lithium transition metal oxide when the radius of the lithium transition metal oxide secondary particle is R μm.

In addition, the positive electrode active material according to the present invention may include at least one element selected from the group consisting of Bi, Sb, Li, Ni, and Co, which are elements derived from a sintering aid, in the lithium transition metal oxide secondary particle. According to the method of the present invention, the sintering aid and the zirconium-containing raw material react to form a liquid phase, and the elements of the sintering aid contained in the liquid phase may penetrate into the inside of the particle along the interface of the primary particles during heat treatment. Accordingly, the positive electrode active material produced according to the production method of the present invention may include at least one element selected from the group consisting of Bi, Sb, Li, Ni, and Co, which are elements derived from a sintering aid, in the lithium transition metal oxide secondary particle.

Meanwhile, the positive electrode active material according to the present invention may further include a coating layer on the surface of the lithium transition metal oxide.

The coating layer is formed on the surface of the secondary particle of the lithium transition metal oxide, and may include at least one coating element (M) selected from the group consisting of B, Li, Al, F, W, Mo, Ti, and Nb.

The coating element may be contained in an amount of 50 ppm to 5,000 ppm, preferably 50 ppm to 2,000 ppm, with respect to the total weight of the positive electrode active material. When the amount of the coating element is too large, the coating layer is formed excessively thick, which may adversely affect capacity properties and resistance properties, and when the amount of the coating element is too small, an electrolyte is not effectively blocked.

As described above, when the coating layer containing at least one coating element selected from the group consisting of B, Li, Al, F, W, Mo, Ti, and Nb is included on the surface of the lithium transition metal oxide, the contact between the electrolyte and the lithium transition metal oxide is blocked through the coating layer, thereby preventing transition metal elution or gas generation.

Positive Electrode

Next, a positive electrode according to the present invention will be described.

The positive electrode according to the present invention includes a positive electrode active material according to the present invention.

Specifically, the positive electrode includes a positive electrode current collector and a positive electrode active material layer positioned on at least one surface of the positive electrode current collector and including the positive electrode active material of the present invention. The positive electrode active material is the same as described above, and thus, components other than the positive electrode active material will be described below.

The positive electrode current collector is not particularly limited as long as it has conductivity without causing a chemical change in a battery. For example, stainless steel, aluminum, nickel, titanium, firing carbon, or aluminum or stainless steel that is surface-treated with one of carbon, nickel, titanium, silver, and the like may be used. In addition, the positive electrode current collector may typically have a thickness of 3 µm to 500 µm, and fine irregularities may be formed on a surface of the current collector to improve the adhesion of a positive electrode active material. For example, the positive electrode current collector may be used in various forms such as a film, a sheet, a foil, a net, a porous body, a foam body, and a non-woven fabric body.

The positive electrode active material layer may include a conductive material and a binder, together with a positive electrode active material.

Here, the positive electrode active material may be included in an amount of 80 wt % to 99 wt %, more specifically 85 wt % to 98 wt % with respect to the total weight of the positive electrode active material layer. When included in the above amount range, the positive electrode active material may exhibit excellent capacity properties.

In this case, the conductive material is used to impart conductivity to an electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used. The conductive material may be included in an amount of 1 wt % to 30 wt % with respect to the total weight of the positive electrode active material layer.

The binder serves to improve the bonding between positive electrode active material particles and the adhesion between the positive electrode active material and the current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 wt % to 30 wt % with respect to the total weight of the positive electrode active material layer.

The positive electrode may be produced according to a typical method of producing a positive electrode except that the positive electrode active material described above is used. Specifically, a positive electrode material mixture, which is produced by dissolving or dispersing the positive electrode active material and selectively, a binder and a conductive material in a solvent, is applied on the positive electrode collector, and the positive electrode may then be produced by drying and roll-pressing the coated positive electrode collector. In this case, types and amounts of the positive electrode active material, the binder, and the conductive material are as described above.

The solvent may be a solvent commonly used in the art, and may be dimethyl sulfoxide (DMSO), isopropyl alcohol, N-methylpyrrolidone (NMP), acetone, water, or the like, and any one thereof or a mixture of two or more thereof may be used. The amount of the solvent to be used is sufficient if the solvent may dissolve or disperse the positive electrode active material, the conductive material, and the binder, and thereafter, have a viscosity which may exhibit excellent thickness uniformity during application for the production of a positive electrode, in consideration of the applying thickness of a slurry and preparation yield.

In addition, in another method, the positive electrode may be produced by casting the positive electrode material mixture on a separate support and then laminating a film separated from the support on the positive electrode current collector.

Lithium Secondary Battery

The positive electrode according to the present invention described above may be applied to an electrochemical device and beneficially used. The electrochemical device may be specifically a battery, a capacitor, or the like, and more specifically, may be a lithium secondary battery.

Specifically, the lithium secondary battery includes a positive electrode, a negative electrode positioned to face the positive electrode, a separator interposed between the positive electrode and the negative electrode, and an electrolyte. The positive electrode is the same as that described above, and thus, a detailed description thereof will be omitted. Hereinafter, only the rest of the components will be described in detail.

In addition, the lithium secondary battery may selectively further include a battery case for accommodating an electrode assembly composed of the positive electrode, the negative electrode, and the separator, and a sealing member for sealing the battery case.

In the lithium secondary battery, the negative electrode includes a negative electrode current collector and a negative electrode active material layer positioned on the negative electrode current collector.

The negative electrode current collector is not particularly limited as long as it has a high conductivity without causing a chemical change in a battery. For example, copper, stainless steel, aluminum, nickel, titanium, firing carbon, copper or stainless steel that is surface-treated with one of carbon, nickel, titanium, silver, and the like, an aluminum-cadmium alloy, and the like may be used. Also, the negative electrode current collector may typically have a thickness of 3 μm to 500 μm, and as in the case of the positive electrode current collector, fine irregularities may be formed on the surface of the negative electrode current collector to improve the adhesion of a negative electrode active material. For example, the negative electrode current collector may be used in various forms such as a film, a sheet, a foil, a net, a porous body, a foam body, and a non-woven fabric body.

The negative electrode active material layer selectively includes a binder and a conductive material in addition to a negative electrode active material.

A compound capable of reversibly intercalating and deintercalating lithium may be used as the negative electrode active material. Specific examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, an Si alloy, an Sn alloy, or an Al alloy; a metal oxide which may be doped and undoped with lithium such as $SiO\beta$ ($0<\beta<2$), $SnO_2$, a vanadium oxide, and a lithium vanadium oxide; or a composite including the metallic compound and the carbonaceous material such as an Si—C composite or an Sn—C composite, and any one thereof or a mixture of two or more thereof may be used. Also, a metallic lithium thin film may be used as the negative electrode active material. Furthermore, low crystalline carbon, high crystalline carbon and the like may all be used as a carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 parts by weight to 99 parts by weight with respect to a total weight of 100 part by weight of a negative electrode active material layer.

The binder is a component for assisting in bonding between a conductive material, an active material, and a current collector, and is typically added in an amount of 0.1 parts by weight to 10 parts by weight with respect to a total weight of 100 parts by weight of a negative electrode active material layer. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber, nitrile-butadiene rubber, fluorine rubber, various copolymers thereof, and the like.

The conductive material is a component for further improving the conductivity of a negative electrode active material, and may be added in an amount of 10 parts by weight or less, specifically 5 parts by weight or less, with respect to a total weight of 100 parts by weight of the negative electrode active material layer. The conductive material is not particularly limited as long as it has conductivity without causing a chemical change in a battery. For example, graphite such as natural graphite or artificial graphite; carbon black such as acetylene black, Ketjen black, channel black, furnace black, lamp black, and thermal black; conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used.

For example, the negative electrode active material layer may be produced by applying a negative electrode material mixture, which is produced by dissolving or dispersing a negative electrode active material, and selectively a binder and a conductive material in a solvent, on a negative electrode current collector and drying the coated negative electrode collector, or may be produced by casting the negative electrode material mixture on a separate support and then laminating a film separated from the support on the negative electrode current collector.

The negative electrode active material layer may be produced by, for example, applying a negative electrode material mixture, which is produced by dissolving or dispersing a negative electrode active material, and selectively a binder and a conductive material in a solvent, on a negative electrode current collector and drying the coated negative electrode collector, or may be produced by casting the negative electrode material mixture on a separate support and then laminating a film separated from the support on the negative electrode current collector.

Meanwhile, in the lithium secondary battery, a separator is to separate the negative electrode and the positive electrode and to provide a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Also, a coated separator including a ceramic component or a polymer material may be used to secure heat resistance or mechanical strength, and may be selectively used in a single-layered or a multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, a molten-type inorganic electrolyte, and the like, all of which may be used in the manufacturing of a lithium secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having a high ionic conductivity and a high dielectric constant and a linear carbonate-based compound having a low viscosity (e.g., ethylmethyl carbonate, dimethyl carbonate, or diethyl carbonate), the mixture which may increase charging/discharging performance of a battery, is more preferable.

Any compound may be used as the lithium salt without particular limitation as long as it may provide lithium ions used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$ or the like may be used. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

In the electrolyte, in order to improve the lifespan properties of a battery, suppress the decrease in battery capacity, and improve the discharge capacity of the battery, one or more kinds of additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included. In this case, the additive may be included in an amount of 0.1 to 5 parts by weight with respect to a total weight of 100 parts by weight of the electrolyte.

The lithium secondary battery including the positive electrode active material according to the present invention as describe above stably exhibits excellent discharging capacity, output properties, and lifespan properties, and thus, are useful for portable devices such as a mobile phone, a notebook computer, and a digital camera, and in the field of electric cars such as a hybrid electric vehicle (HEV).

Accordingly, according to another embodiment of the present invention, a battery module including the lithium secondary battery as a unit cell, and a battery pack including the same are provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell which is used as a power source for a small-sized device, and may also be preferably used as a unit cell for a medium- and large-sized battery module including a plurality of battery cells.

MODE FOR CARRYING OUT THE INVENTION

Hereinafter, the present invention will be described in detail with reference to embodiments. However, the embodiments according to the present invention may be modified into other various forms, and the scope of the present invention should not be construed as being limited to the embodiments described below. The embodiments of the present invention are provided to more fully describe the present invention to those skilled in the art.

Example 1

$Ni_{0.88}Co_{0.05}Mn_{0.07}(OH)_2$ and $LiOH·H_2O$ were mixed such that the molar ratio of Li/Me was 1.07, and then fired for 10 hours at 780° C. to produce a lithium transition metal oxide. $ZrO_2$ and $Bi_2O_3$ (sintering aid) were mixed with the lithium transition metal oxide through an acoustic mixer (LabRAM II, Resodynm). In this case, $ZrO_2$ and $Bi_2O_3$ above were mixed in an amount such that the amount of zirconium was 5,800 ppm and the amount of bismuth was 1,500 ppm with respect to the total weight of the lithium transition metal oxide. Next, the mixed powder was heat treated at 750° C. for 5 hours in an oxygen atmosphere to produce a Zr-coated lithium transition metal oxide. Thereafter, the Zr-coated lithium transition metal oxide was mixed with distilled water in a weight ratio of 1:1, and washed with water for 5 minutes.

Thereafter, boric acid was mixed with the washed lithium transition metal oxide such that boron was included in an amount of 500 ppm based on total weight of the lithium transition metal oxide, and the mixture was heat treated at 300° C. for 5 hours to produce a positive electrode active material having a boron coating layer on the surface of the lithium transition metal oxide.

Example 2

A positive electrode active material was produced in the same manner as in Example 1, except that as a sintering aid, $LiOH·H_2O$ was mixed instead of $Bi_2O_3$, in an amount such that Li was 400 ppm with respect to the total weight of the lithium transition metal oxide.

Example 3

A positive electrode active material was produced in the same manner as in Example 1, except that as a sintering aid, $Co_2O_3$ was mixed instead of $Bi_2O_3$, in an amount such that Co was 1,700 ppm with respect to the total weight of the lithium transition metal oxide.

Comparative Example 1

$Ni_{0.88}Co_{0.05}Mn_{0.07}(OH)_2$ and $LiOH·H_2O$ were mixed such that the molar ratio of Li/Me was 1.07, and then fired for 10 hours at 780° C. to produce a lithium transition metal oxide, and then the lithium transition metal oxide was used as a positive electrode active material.

Comparative Example 2

$Ni_{0.88}Co_{0.05}Mn_{0.07}(OH)_2$ and $LiOH \cdot H_2O$ were mixed such that the molar ratio of Li/Me was 1.07, and then fired for 10 hours at 780° C. to produce a lithium transition metal oxide.

$ZrO_2$ was mixed with the lithium transition metal oxide through an acoustic mixer (LabRAM II, Resodynm). In this case, $ZrO_2$ above was mixed in an amount such that the amount of zirconium was 5,800 ppm with respect to the total weight of the lithium transition metal oxide. Next, the mixed powder was heat treated at 750° C. for 5 hours in an oxygen atmosphere to produce a Zr-coated lithium transition metal oxide. Thereafter, the Zr-coated lithium transition metal oxide was mixed with distilled water in a weight ratio of 1:1, and washed with water for 5 minutes.

Thereafter, boric acid was mixed with the washed lithium transition metal oxide such that boron was included in an amount of 500 ppm with respect to 100 parts by weight of the lithium transition metal oxide, and the mixture was heat treated at 300° C. for 5 hours to produce a positive electrode active material having a boron coating layer on the surface of the lithium transition metal oxide.

Experimental Example 1

Surfaces of positive electrode active material particles produced in Example 1 and Comparative Example 2 were observed using a scanning electron microscope.

Figure 3:
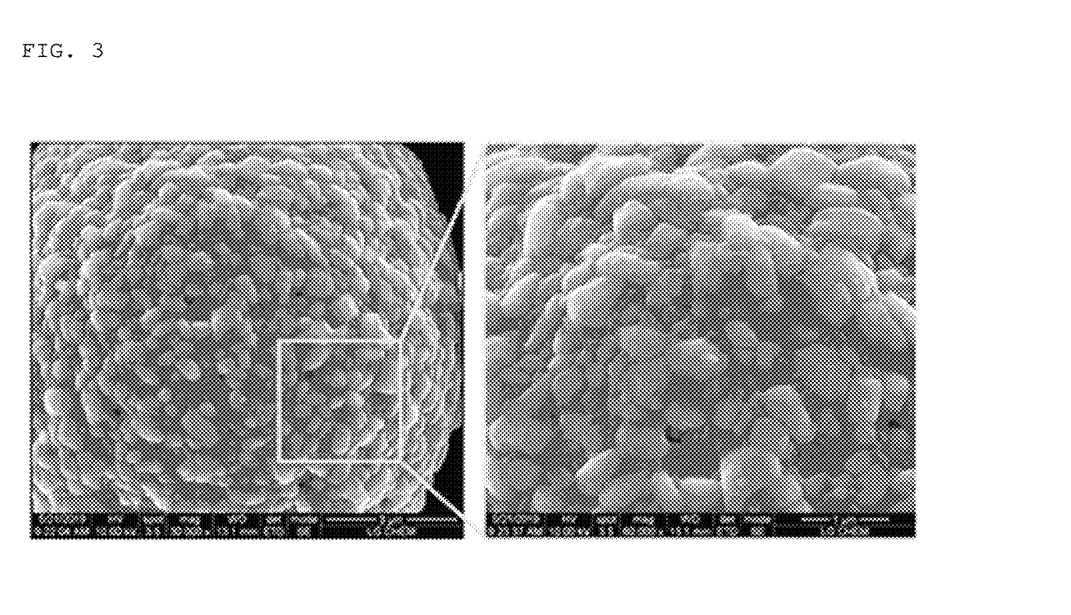
FIG. 3 is an SEM image of the surface of a positive electrode active material produced in Example 1.
Figure 4:
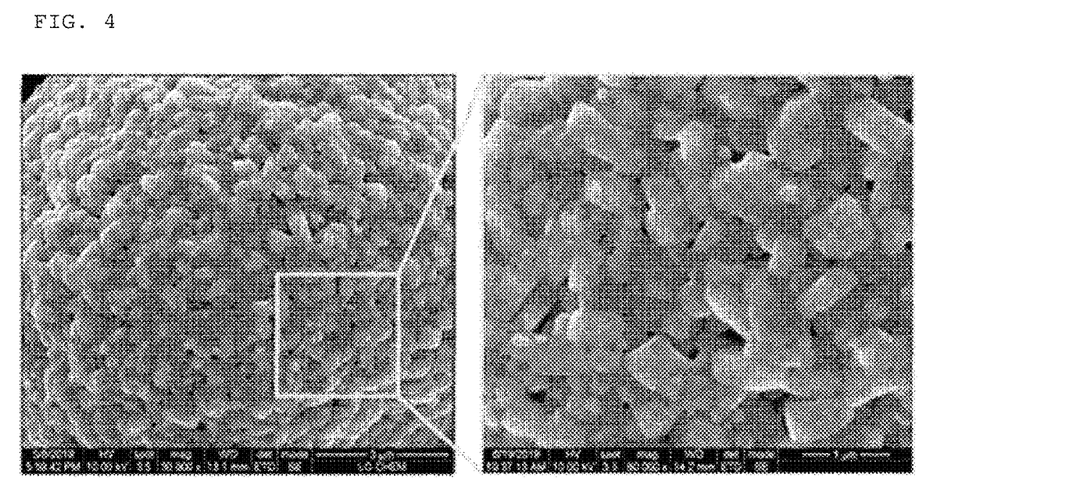
FIG. 4 is an SEM image of the surface of a positive electrode active material produced in Comparative Example 2.

FIG. 3 shows an SEM image of the surface of the positive electrode active material produced in Example 1, and FIG. 4 shows an SEM image of the surface of the positive electrode active material produced in Comparative Example 2.

As shown in FIG. 3, it is confirmed that in the positive electrode active material of Example 1, small-sized particles (zirconium) were intensively distributed at the outer interface of the lithium transition metal oxide secondary particle. In contrast, as shown in FIG. 4, it is confirmed that in the positive electrode active material of Comparative Example 2, small-sized particles were evenly distributed throughout the surface of the lithium transition metal oxide secondary particle.

Experimental Example 2

The mixed powder of the lithium transition metal oxide before heat treatment and $ZrO_2$ and/or a sintering aid in Examples 1 to 2 and Comparative Example 2 was collected, and then the amount A of Zr attached to the surface of the lithium transition metal oxide before heat treatment was measured using an EDS analysis tool in the SEM equipment.

Next, the Zr-coated lithium transition metal oxide powder obtained by heat treating the mixed powder in Examples 1 and 2 and Comparative Example 2 was collected, and then the amount B of Zr attached to the surface of the lithium transition metal oxide after heat treatment was measured using an EDS analysis tool in the SEM equipment. Here, the EDS analysis was measured under the conditions of voltage=15 kV, working distance=10 mm, and spot size=5.5.

Then, the ratio of Zr coated inside the lithium transition metal oxide particle and the ratio of Zr coated on the surface of the lithium transition metal oxide particle were calculated according to Equations 1 and 2 below, and the calculation results are shown in Table 1 below.

ratio of Zr coated inside lithium transition metal oxide particle (%)=$(A-B/A) \times 100$     Equation (1):

ratio of Zr coated on the surface of lithium transition metal oxide particle (%)=$(B/A) \times 100$     Equation (2):

TABLE 1

|  | Ratio of Zr coated inside lithium transition metal oxide particle (%) | Ratio of Zr coated on the surface of lithium transition metal oxide particle (%) |
| --- | --- | --- |
| Example 1 | 12 | 88 |
| Example 2 | 17 | 83 |
| Comparative Example 2 | 0 | 100 |

As shown in Table 1 above, it is confirmed that in Examples 1 and 2 subjected to the heat treatment in the presence of a sintering aid, some of Zr penetrated into the particle, whereas in Comparative Example 2 without using a sintering aid, a Zr coating film was formed only on the surface of the particle, and Zr did not penetrate into the particle.

Experimental Example 3

The positive electrode active material powder produced in Examples 1 to 2 and Comparative Example 2 was uniaxially pressed using a uniaxial pressurizer (4350 model, CARVER) under 9 tons of pressure to measure particle size distribution, using a particle size analyzer (s3500, microtrac). The measurement results are shown in FIGS. 5 and 6.

Figure 5:
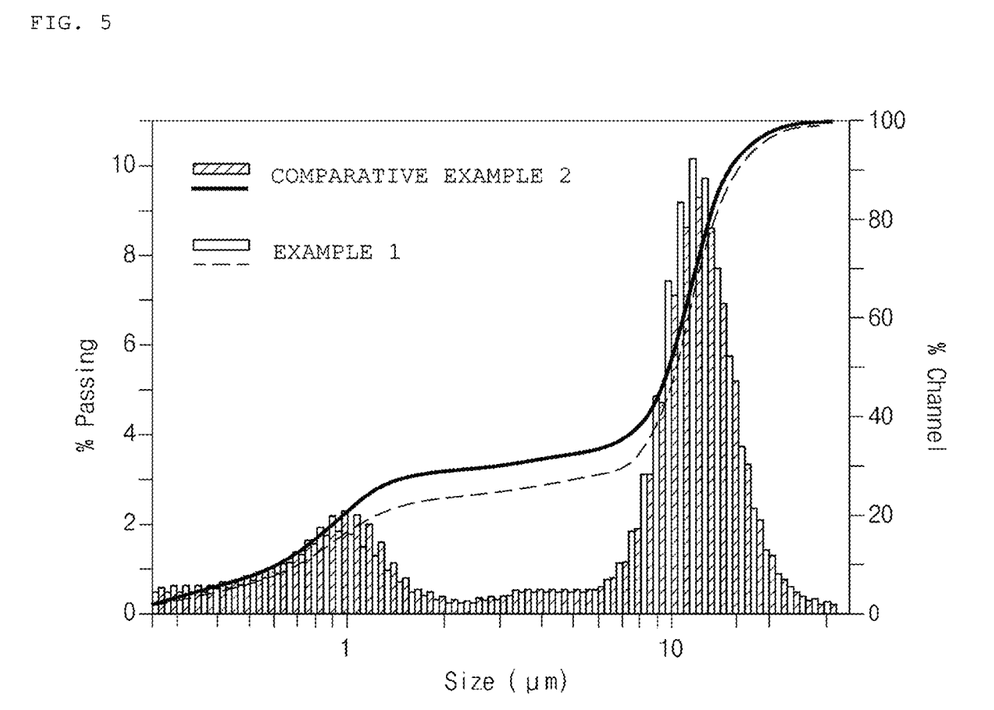
FIG. 5 is a graph showing the particle size distribution of positive electrode active material powder produced in Example 1 and Comparative Example 2 after exposure to 9 tons of pressure.
Figure 6:
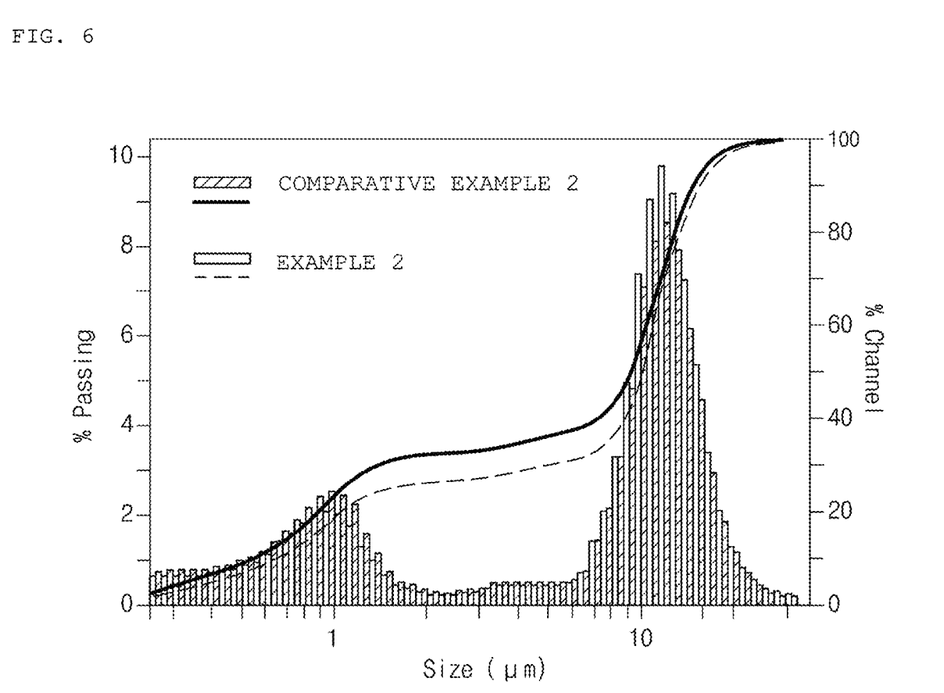
FIG. 6 is a graph showing the particle size distribution of positive electrode active material powder produced in Example 2 and Comparative Example 2 after exposure to 9 tons of pressure.

As shown in FIGS. 5 and 6, it is confirmed that the positive electrode active material powder produced in Examples 1 and 2 had a less amount of fine powder than the positive electrode active material powder produced in Comparative Example 2.

Experimental Example 4

Lithium secondary batteries were produced using the positive electrode active materials produced in each of Examples 1 to 3 and Comparative Examples 1 and 2, and the capacity of each of the lithium secondary batteries including the positive electrode active materials of each of Examples 1 to 3 and Comparative Examples 1 and 2 was evaluated.

Specifically, the positive electrode active materials produced in each of Examples 1 to 3 and Comparative Examples 1 and 2, a carbon black conductive material, and a polyvinylidene fluoride (PVdF) binder were mixed at a weight ratio of 96:2:2 in a N-methyl-2-pyrrolidone (NMP) solvent to produce a positive electrode slurry. The positive electrode slurry was applied on one surface of an aluminum current collector, dried at 100° C., and then roll-pressed to produce a positive electrode.

Meanwhile, lithium metal was used as a negative electrode.

A porous polyethylene separator was interposed between the positive electrode and the negative electrode produced above to produce an electrode assembly, and the electrode assembly was placed inside a battery case. Thereafter, an electrolyte solution was injected into the inside of the case to produce a lithium secondary battery. In this case, as the electrolyte solution, an electrolyte solution produced by dissolving 1 M of LiPF$_6$ in a mixed organic solvent in which ethylene carbonate(EC), ethyl methyl carbonate(EMC), and diethyl carbonate (DEC) were mixed in a volume ratio of 3:4:3 was used to produce a lithium secondary battery according to Examples 1 to 3 and Comparative Examples 1 and 2.

Charging/discharging in which each of the lithium secondary batteries produced in Examples 1 to 3 and Comparative Examples 1 and 2 was charged up to 4.3 V with a constant current of 0.33 C at 45° C. and then discharged up to 3.0 V with a constant current of 0.33 C was set as one cycle, and the cycle was repeated 30 times to measure capacity retention rate and resistance increase rate. In this case, the capacity retention rate was calculated as the ratio of the discharge capacity after 30 cycles to the discharge capacity after 1 cycle, and the resistance increase rate was calculated as a percentage of the resistance increase against the resistance after 1 cycle, and the results are shown in Table 2 below.

TABLE 2

|  | Capacity retention rate (%) | Resistance increase rate (%) |
| --- | --- | --- |
| Example 1 | 95.6 | 124.3 |
| Example 2 | 95.7 | 124.7 |
| Example 3 | 95.7 | 125.5 |
| Comparative Example 1 | 94.4 | 151.3 |
| Comparative Example 2 | 95.5 | 130.1 |

As shown in Table 2 above, it is confirmed that the lithium secondary batteries to which the positive electrode active materials of Examples 1 to 3 produced by adding a zirconium-containing raw material and a sintering aid together during firing were applied have excellent lifespan characteristics when compared to the lithium secondary batteries to which the positive electrode active materials of Comparative Examples 1 and 2 were applied.

The invention claimed is:

1. A positive electrode active material comprising:
   a lithium transition metal oxide in the form of a secondary particle in which primary particles are aggregated,
   wherein a zirconium-containing coating film is formed on a surface of the secondary particle and at an interface between the primary particles present inside the secondary particle,
   wherein an amount of zirconium applied inside the secondary particle of the lithium transition metal oxide with respect to a total amount of zirconium applied on the lithium transition metal oxide is 1 atm % to 50 atm %, and
   wherein at least one element selected from the group consisting of Bi and Sb is included inside the secondary particle.

2. The positive electrode active material of claim 1, wherein the positive electrode active material contains zirconium in an amount of 50 ppm to 50,000 ppm based on a total weight of the positive electrode active material.

3. The positive electrode active material of claim 1, wherein the lithium transition metal oxide is represented by Formula 1 below:

$$Li_aNi_xCo_yM^1_zM^2_wO_2 \quad \text{[Formula 1]}$$

wherein M$^1$ is Mn, Al, or a combination thereof, and M$^2$ is at least one selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and 0.8≤a≤1.2, 0<x<1, 0<y<1, 0<z<1, and 0≤w≤0.1.

4. The positive electrode active material of claim 1, further comprising a coating layer formed on a surface of the lithium transition metal oxide secondary particle and containing at least one coating element selected from the group consisting of B, Li, Al, F, W, Mo, Ti, and Nb.

5. A positive electrode for a lithium secondary battery comprising the positive electrode active material of claim 1.

6. A lithium secondary battery comprising the positive electrode for a lithium secondary battery according to claim 5.

* * * * *